United States Patent [19]

Milberger

[11] Patent Number: 5,382,056
[45] Date of Patent: Jan. 17, 1995

[54] RISER WEAK LINK
[75] Inventor: Lionel J. Milberger, Houston, Tex.
[73] Assignee: ABB Vetco Gray Inc., Houston, Tex.
[21] Appl. No.: 90,821
[22] Filed: Jul. 12, 1993
[51] Int. Cl.⁶ ............................................ F16L 35/00
[52] U.S. Cl. ........................................ 285/1; 285/18;
285/330; 166/243; 29/426.5
[58] Field of Search .................. 285/1, 2, 321, 920,
285/84, 85, 86, 18, 315, 922, 330; 166/242, 243;
29/426.5

[56] References Cited
U.S. PATENT DOCUMENTS

| | | | |
|---|---|---|---|
| 1,995,109 | 3/1935 | Smittle | 285/906 X |
| 3,383,122 | 5/1968 | Richardson . | |
| 3,450,421 | 6/1969 | Harwell | 285/321 X |
| 3,498,374 | 3/1970 | Drouin . | |
| 3,659,877 | 5/1972 | Kubasta . | |
| 3,944,263 | 3/1976 | Arnold | 285/321 X |
| 4,138,148 | 2/1979 | Zaremba | 285/321 X |
| 4,156,307 | 5/1979 | Haught | 285/321 X |
| 4,310,048 | 1/1982 | Mott . | |
| 4,364,587 | 12/1982 | Samford | 285/920 X |
| 4,451,056 | 5/1984 | Galle | 285/86 X |
| 4,688,827 | 8/1987 | Bassett . | |
| 5,161,828 | 11/1992 | Hynes et al. . | |

Primary Examiner—Dave W. Arola
Attorney, Agent, or Firm—James E. Bradley

[57] ABSTRACT

A riser string connecting a floating vessel to a subsea well has a weak link coupling which will part the riser string once a minimum force is reached. The weak link coupling has a release mechanism which operates at the minimum force. An arming device has a locked position which will prevent operation of the release mechanism. The operator can remotely shift the arming device into an armed position in which the release mechanism will release at the minimum force. The operator can shift the arming device back to the unarmed position if separation did not occur. An actuator will move the arming device from the locked position to the release position. Tapered surfaces on the box and pin of the weak link coupling neutralize the effect of bending moments on the weak link coupling.

23 Claims, 3 Drawing Sheets

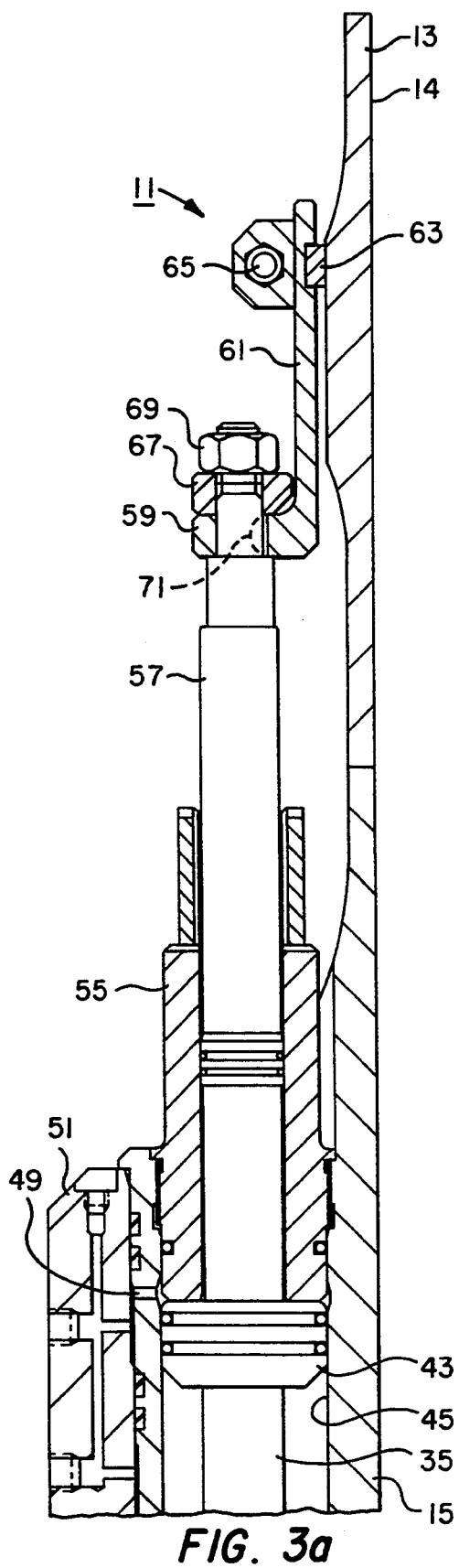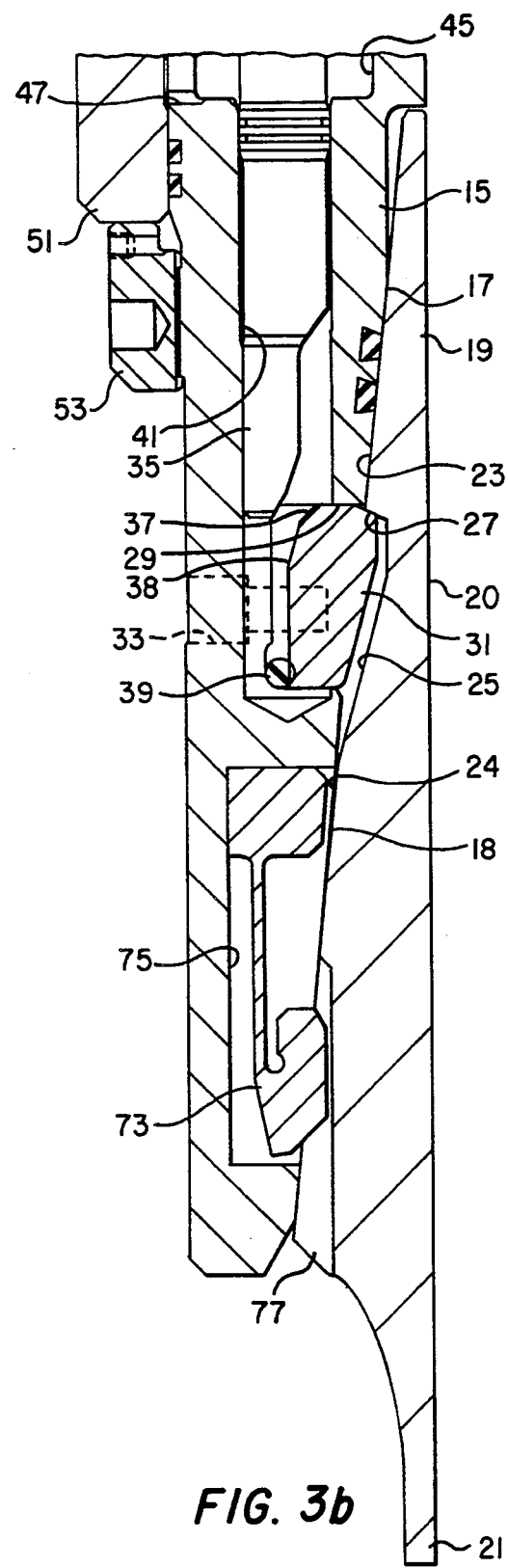
FIG. 3a
FIG. 3b

RISER WEAK LINK

BACKGROUND OF THE INVENTION

1. Field of the Invention

This invention relates in general to subsea well drilling and production riser strings, and in particular to an emergency disconnect system that disconnects the lower end of the riser from the well during excessive bending and/or tension in the event of an emergency.

2. Description of the Prior Art

In offshore oil well drilling, a floating vessel will be used. The well at the sea floor connects to the vessel by means of a riser. The vessel may be anchored by anchors and other tensioning means over the well or wells or it may be a dynamically positioned vessel. Wave, wind and current can cause bending of the riser due to movement of the vessel. The riser is designed to withstand a certain amount of bending and tension that will be encountered during normal conditions. If an emergency condition arises due to a severe storm or other unusual circumstance, such as loss of anchors or station keeping ability of a dynamically positioned vessel, the riser may undergo excessive tensioning when the tensioners bottom out. The riser may part at some point along its length. This could result in major equipment damage and serious problems in retrieving and installing the riser again.

Riser strings connect to the lower marine riser package by hydraulic wellhead connectors. The wellhead connectors normally employ some type of gripping member, such as dogs, that are pushed by a cam ring radially inward into engagement with grooves formed on the exterior of the wellhead housing. Hydraulic cylinders move the cam ring axially to lock and release the gripping members. In the event of a storm, the operator could release the lower end of the riser from the blowout preventer stack if the bending or tension forces become excessive. However, the operator may not realize when the forces become excessive, therefore the riser string could part before the releasing occurs. Also, the release mechanism might fail.

Weak links have been proposed for riser systems. Generally the proposals involve employing frangible members that hold two of the sections together at a point near the lower end of the riser. The frangible members are selected to part at a lower axial force than any other portion of the riser. A drawback, however, is that conditions less than a true emergency may result in the frangible members parting unless they have a very high strength. If the strength is too high, damage could occur to the riser before the weak point parts.

SUMMARY OF THE INVENTION

In this invention, a weak link is provided for a riser string which has a release means that will allow two riser pipe sections to part from each other if an axial minimum force is applied. An arming means has a locked position which will prevent operation of the release means during normal operations. Even if the minimum force is reached, the release means will not allow the riser to part if the arming device is in the locked position.

The arming means has an armed position which will arm the release means so that it will release at the minimum force. An actuator remotely controlled at the drilling vessel will move the arming means between the armed and locked positions.

In the preferred embodiment, the release means comprises a resilient split ring that is inward biased. The split ring is carried in a groove in a box member for engaging a groove on a pin member of the weak link coupling. A selected minimum axial force will push the split ring outward from the locking groove, allowing the coupling to part.

The arming device comprises a back-up member that locates radially outward of the split ring. The arming device prevents the split ring from moving radially outward when in the locked position. When the actuator moves the back-up member axially, the split ring is able to move from the locking groove if the minimum axial force due to excessive bending occurs.

BRIEF DESCRIPTION OF THE DRAWINGS

FIGS. 3a and 3b comprise a vertical sectional view of the weak link coupling of FIG. 1, and showing the arming device in an armed position.

DETAILED DESCRIPTION OF THE INVENTION

Figure 1A:
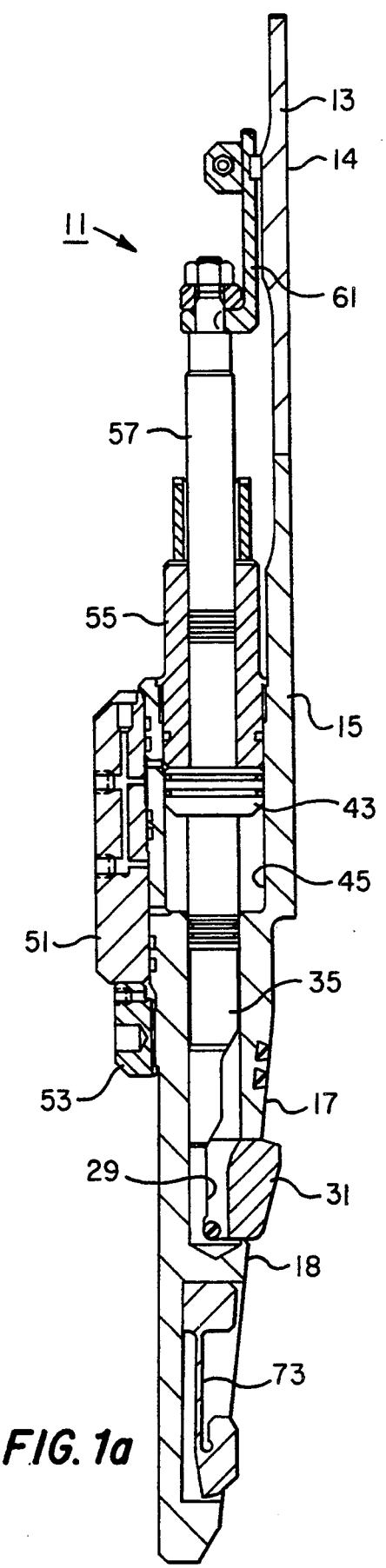
FIGS. 1a and 1b comprise a vertical sectional view illustrating a weak link coupling constructed in accordance with this invention, and shown prior to connecting the upper and lower members together.

Referring to the figures, weak link coupling 11 will be installed in a riser string near the lower end where the riser string connects to a lower marine riser package (not shown). The riser string will be otherwise conventional, extending from a floating vessel to the subsea well assembly. Weak link coupling 11 has an upper pipe section 13 that extends upward and secures conventionally by bolts (not shown) to a pipe section in the riser string. Pipe section 13 has an axial bore 14. Weak link coupling 11 has a downward facing socket connector or box 15. Box 15 is tubular and has a pair of smooth tapered internal surfaces 17, 18, axially spaced from each other and tapered at approximately the same angle. There are no threads in box 15.

Figure 1B:
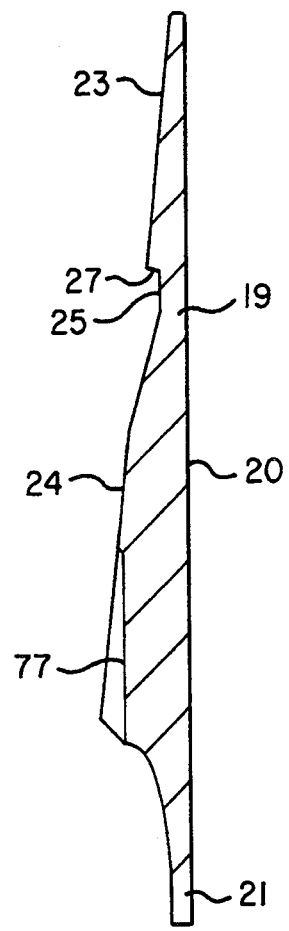

Weak link coupling 11 also includes a tubular pin 19, shown in FIG. 1b, which has an axial bore 20. Pin 19 is welded to the upper end of a lower pipe section 21. Lower pipe section 21 extends down and connects to a lower pipe section or other equipment in the riser. Pin 19 has a pair of external tapered surfaces 23, 24 tapered approximately at the same angle as tapered surfaces 17, 18 of box 15. Pin 19 will slide freely into box 15. The taper of the conical smooth surfaces 17, 18 and 23, 24 is between five and six degrees relative to the longitudinal axis of weak link coupling 11. Because of the tapers and friction acting at the surfaces, a bending moment or force applied to upper pipe section 13 converts to substantially a neutral axial force on box 15. Because of the angle of the tapered sections 17, 18 and 23, 24 very little force will be exerted on the tapered surfaces 17, 23.

Figure 2A:
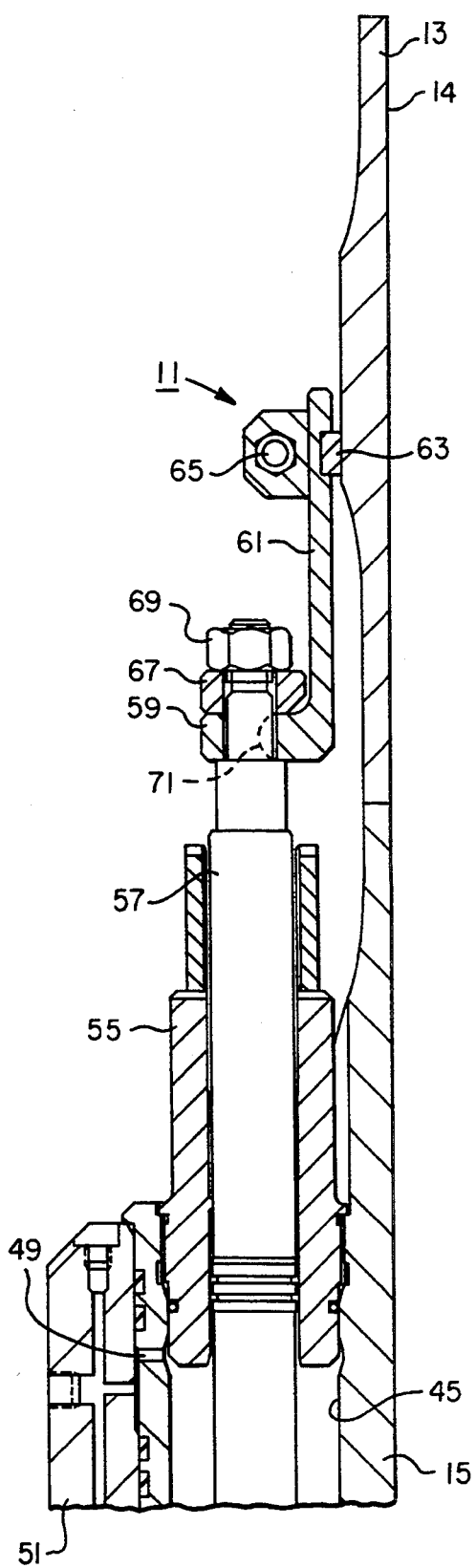
FIGS. 2a and 2b comprise a vertical sectional view of the weak link coupling of FIG. 1, shown connected and in a locked position.
Figure 2B:
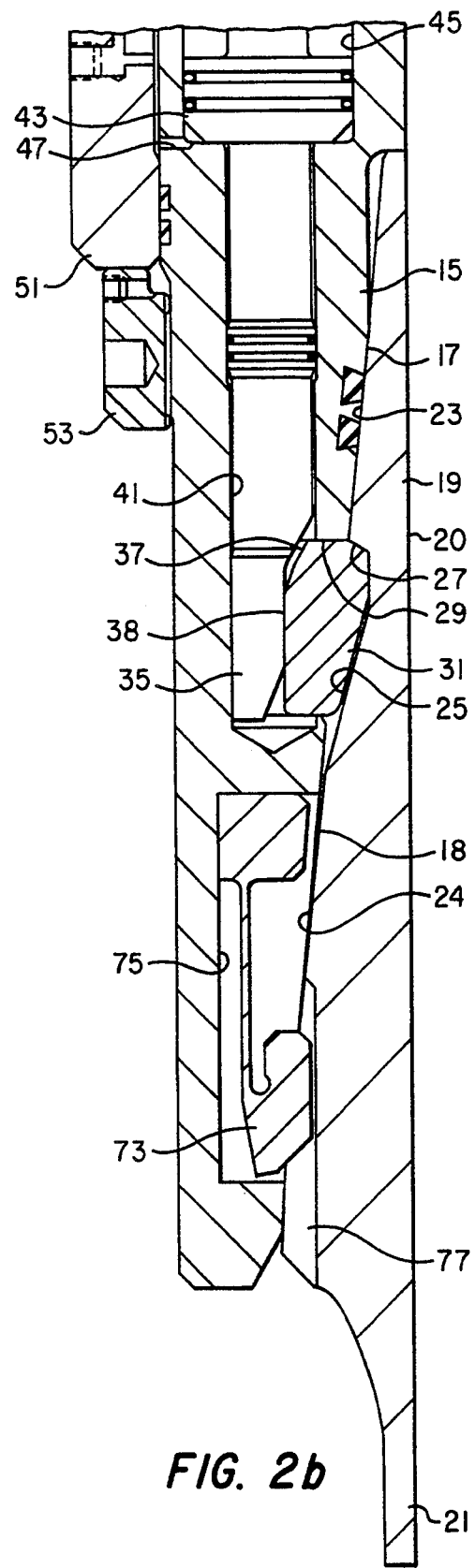

Referring to FIGS. 2b and 3b, an external locking groove 25 locates on the exterior of pin 19. Locking groove 25 separates tapered surfaces 23, 24 from each other. Locking groove 25 is an annular groove and has a downward facing locking shoulder 27. Locking shoulder 27 is also tapered, but at an angle of about 20 degrees relative to a plane that is perpendicular to the longitudinal axis of weak link coupling 11. In other words, the taper of locking shoulder 27 is about 70 degrees relative to the longitudinal axis of weak link coupling 11.

A retaining groove 29 is located in the interior of box 15 at the lower end of tapered surface 17 and upper end of tapered surface 18. Retaining groove 29 is annular and positioned to align radially with locking groove 25. A release member 31 is carried in retaining groove 29. Release member 31 is a metal, preferably steel, ring that is split and inwardly biased. That is, in its natural condition, it will protrude radially inward from tapered surface 17. A large force required to push release member 31 outward into a fully recessed position in locking groove 25. In the fully recessed position, the inner surface of release member 31 will be flush with box tapered surface 17. An orienting pin 33 extends radially inward from the exterior of box 15 and inserts into the split of release member 31. Orienting pin 33 prevents rotation of release member 31 from a desired position.

If a sufficiently large axial force is applied to pull box 15 upward from pin 19, the tapered locking shoulder 27 will exert a radial outward component release member 31, tending to push it out from locking groove 25. If pushed out sufficiently, box 15 will be free to separate from pin 19. Release member 31 thus serves as a release means for allowing the weak link coupling 11 to part at a selected minimum force.

An arming means prevents this occurrence unless the operator moves the arming means to an armed position. The arming means comprises a plurality of back-up members 35. The back-up members 35 comprise axially extending rods located in retaining groove 29 radially outward from release member 31. Back-up members 35 are circumferentially spaced around retaining groove 29. The exterior of release member has an upper conical cam surface 37 and a cylindrical surface 38 extending below cam surface 37. The inner surfaces of back-up members are flat and engage cylindrical surface 38. When back-up members 35 are moved downward, they will act in unison with each other to exert a force on a cam surface 37, then will slidingly engage cylindrical surface 38. When in the lower position shown in FIG. 2b, the back-up members 35 engage cylindrical surface 38, exerting a radially inward preload force on release member 31, causing release member 31 to tightly engage locking shoulder 27. An elastomeric ring 39 (FIG. 3b) locates at the lower end of locking groove 25 to position release member 31 in retaining groove 29 when back-up members are in the upper position shown in FIG. 3b.

Each back-up member 35 is a rod that extends upward through a bore 41 and is integrally joined to a piston 43. Each piston 43 is carried in a cylinder 45 in box 15. Cylinder 45 has retract ports 47 which will cause piston 43 to move upward. Referring to FIGS. 2a and 3a, advance ports 49 extending into cylinder 45 cause pistons 43 to move downward. Ports 47, 49 extend not only through the wall of box 15 but also register with mating passages in an annular manifold 51. Manifold 51 is held in place by a lock ring 53 which secures by threads to box 15. The ports of manifold 51 are connected to a hydraulic line (not shown) that extends alongside the riser to the vessel for supplying hydraulic fluid pressure downward to the blowout preventer system.

Each cylinder 45 has a cylinder extension 55 that extends upward therefrom. A rod 57 is integrally formed with each piston 43 and extends upward from each piston 43 and through cylinder extension 55. A retainer flange 59 secures to the upper ends of the piston rods 57. Retainer flange 59 is divided into two halves, each having a neck portion which defines a neck 61 once assembled. Neck 61 has an annular wear ring 63 located in it that will slide on the upper pipe section 13. Bolts 65 join the two halves of retainer flange 59 and neck 61. Neck 61 encircles upper pipe section 13.

A retainer plate 67 also secures to the upper ends of all of the piston rods 57. Retainer plate 67 is also an annular member made up of two halves so that it can be placed around upper pipe section 13. Retainer plate 67 is oriented so that the split of its two halves is 90 degrees from the split of the two halves of retainer flange 59. As a result of the 90 degree offset, the combination makes up a solid member.

A nut 69 secures to threads formed on the upper end of each piston rod 57. A key 71 fits within a vertical slot in each rod 57 and a mating slot in retainer flange 59. Key 71 prevents any rotation of piston rods 57 while nuts 69 are being tightened. Key 71 also orients the inner surface of backup member 35 which mates with the outer diameter of the releasing member 31. Retainer flange 59 and retainer plate 67 cooperate to require all of the piston rods 57 to move in unison between the upper and lower positions.

Referring to FIGS. 2b and 3b, an antirotation spring 73 is located in a groove 75 at the lower end of box 15. Antirotation spring 73 engages a vertical 77 formed on the exterior of pin 19. Antirotation spring 73 prevents pin 19 from rotating relative to box 15 once engaged.

In operation, upper pipe section 13 will be joined to the lower end of the riser string as it is being mace up at the vessel and lowered into the sea. Lower pipe section 21 secures to the upper end of the lower portion of the riser string. While stabbing box 15 with pin as shown in FIGS. 1a and 1b, the pistons 43 will be an upper position. Back-up members 35 will be spaced axially upward from release member 31. The natural inward bias of release member 31 will cause it to protrude radially inward from retaining groove 29.

As the box 15 is lowered over pin 19, the tapered surfaces 17, 18 will slide on tapered surfaces 23, 24. The pin tapered surfaces 23, 24 will push release member 31 radially outward until release member 31 aligns with locking groove 25. At that point, release member 31 will spring back radially inward due to its natural resiliency. Antirotation spring 73 will be aligned with slot 77 by rotating the box 15 and pin 19 slightly relative to each other until antirotation spring 73 engages slot 77.

Hydraulic pressure from the vessel will be applied to advance ports 49, causing pistons 43 to move downward. The back-up members 35 will move downward and push the release member 31 further inward, tightly preloading it in radial compression against locking shoulder 27. This locked position is shown in FIGS. 2a and 2b. The hydraulic pressure may be removed as the riser is lowered further into the sea, made up section by section in a conventional manner.

The lower end of the riser string will be connected to the well assembly conventionally. Operations will occur normally. The back-up members 35 will remain in the locked position, preventing any radial outward movement of release member 31. If hydraulic pressure fails, any bending moments will not cause any upward movement of back-up members 35 because of the engagement of the cylindrical exterior 38 of release member 31 with the mating interior surfaces of back-up members 35.

Back-up members 35 will move upward to the armed position shown in FIGS. 3a and 3b only when hydraulic pressure from the vessel is applied to retract ports 47 to cause pistons 43 to move upward. An operator might do this to arm weak link coupling 11 if an exceptional storm is expected wherein the vessel might move laterally relative to the well to an excessive amount. Once pistons 43 are in the upper position, however, no parting of weak link coupling 11 will occur unless the excessive tension force occurs. If the bending reaches such an amount that the axial force to pull box 15 upward from pin 19 is great enough, then the lower edge of retaining groove 29 and locking shoulder 27 will push release member 31 radially outward. Once release member 3 clears locking shoulder 27, box 15 will be free to move upward, parting the riser string at weak link coupling 11. In the preferred embodiment, the desired axial force to cause weak link 11 to part is approximately 300,000 pounds upward force. The weak link coupling 11 has at least the same strength as the rest of the riser string when the arming back-up members 35 are in the locked position.

The invention has significant advantages. The arming mechanism, when in a locked position, prevents the release means from operating. Consequently, no inadvertent parting will occur during normal operations. The weak link coupling does not have less strength than any other portions of the riser string when locked. The arming device allows the weak link coupling to part at a minimum axial force only when the operator places the arming device in the armed position.

While the invention has been shown in only one of its forms, it should be apparent to those skilled in the art that it is not so limited, but is susceptible to various changes without departing from the scope of the invention.

I claim:

1. In a string of riser extending from a floating vessel to a subsea well, the string of riser having a plurality of pipe sections joined by pipe couplings, the improvement comprising in combination:
   a weak link pipe coupling joining two of the pipe sections together and having an axis;
   release means mounted to the weak link pipe coupling for releasing two of the pipe sections from each other if a selected axial minimum force of substantial magnitude is applied due to excessive bending of the riser;
   arming means including an arming member having a locked position for preventing operation of the release means to prevent the release means from releasing even if the minimum force is reached, and having an armed position for arming the release means to release at the minimum force; and
   actuator means operable in response to hydraulic pressure supplied through a line exterior of the riser from the floating vessel for moving the arming member between the armed and locked positions.

2. The improvement according to claim 1 wherein the selected axial minimum force is substantially 300,000 pounds.

3. The improvement according to claim 1 wherein the actuator means comprises at least one hydraulic cylinder and piston mounted to the weak link coupling and to the arming member for moving the arming member axially between the armed and locked positions.

4. The improvement according to claim 1 wherein at least part of the release means includes a release member which moves radially outward relative to the axis of weak link pipe coupling when releasing the weak link pipe coupling, and wherein the arming member comprises a back-up member which locates radially outward of and in engagement with the release member when in the locked position to prevent said radial outward movement, and is moved axially by the actuator means relative to the release member when in the armed position to allow the release member to move radially outward.

5. The improvement according to claim 1 wherein at least part of the release means comprises:
   a recessed area defining a downward facing locking shoulder located on an exterior surface of one of the pipe sections of the weak link coupling;
   a release member carried by the other of the pipe sections of the weak link coupling and located in engagement with the locking shoulder when in the locked position, the release member being movable radially outward from the shoulder relative to the axis of weak link pipe coupling in response to the minimum axial force being reached when releasing the weak link pipe coupling; and wherein the arming member comprises:
   a back-up member which locates radially outward of and in engagement with the release member when in the locked position to prevent said radial outward movement, and is moved axially by the actuator means relative to the release member when in the armed position to allow the release member to move radially outward.

6. The improvement according to claim 1 wherein one of the pipe sections of the weak link coupling has a box with an internal smooth tapered surface that is tapered at an angle of about five to six degrees relative to the axis of the weak link coupling, and wherein the other of the pipe sections of the weak link coupling has a pin that slides within the box and which has a smooth exterior surface that slidingly engages the tapered surface of the box and is at substantially the same angle as the tapered surface of the box for converting bending forces into axial forces.

7. In a string of pipe sections joined by pipe couplings, the string having a weak link pipe coupling joining two of the pipe sections together, the weak link pipe coupling having an axis and release means for releasing the two pipe sections from each other if an axial minimum force is applied, the improvement comprising in combination:
   arming means having a locked position for preventing operation of the release means to prevent the release means from releasing even if the minimum force is reached, and having an armed position for arming the release means to release at the minimum force; and
   actuator means for moving the arming means between the armed and locked positions; and wherein:
   one of the pipe sections of the weak link coupling has a pin and the other a box that slidingly receives the pin; and wherein the release means comprises:
   a locking groove located on an exterior surface of the pin;
   a retaining groove located in the box;

a release member carried in the retaining groove and located in engagement with the locking groove when in the locked position, the release member being movable radially outward from the locking groove relative to the axis of weak link pipe coupling when releasing the weak link pipe coupling, and wherein the arming means comprises:

a back-up member which locates radially outward of the release member when in the locked position to prevent said radial outward movement and is moved axially by the actuator means relative to the release means when in the armed position to allow the release member to move radially outward.

8. In a string of pipe sections joined by pipe couplings, the string having a weak link pipe coupling joining two of the pipe sections together, the weak link pipe coupling having an axis and release means for releasing the two pipe sections from each other if an axial minimum force is applied, the improvement comprising in combination:

arming means having a locked position for preventing operation of the release means to prevent the release means from releasing even if the minimum force is reached, and having an armed position for arming the release means to release at the minimum force; and actuator means for moving the arming means between the armed and locked positions; and wherein:

one of the pipe sections of the weak link coupling has a pin and the other a box that slidingly receives the pin; wherein the release means comprises:

a locking groove located on an exterior surface of the pin;

a retaining groove located in the box;

a release member carried in the retaining groove and located in engagement with the locking groove when in the locked position, the release member being movable radially outward from the locking groove relative to the axis of weak link pipe coupling when releasing the weak link pipe coupling; wherein the arming means comprises:

a back-up member which locates radially outward of the release member when in the locked position to prevent said radial outward movement and is moved axially by the actuator means relative to the release member when in the armed position to allow the release member to move radially outward; and wherein the actuator means comprises at least one hydraulic cylinder and piston mounted to the box and connected to the back-up member.

9. In a string of riser extending from a floating vessel to a subsea well, the string of riser having a plurality of pipe sections joined by pipe couplings, the improvement comprising in combination:

a weak link pipe coupling joining two of the pipe sections together, the weak link pipe coupling having an axis and a pin on one of the pipe sections that slidingly locates within a box on the other of the pipe sections of the weak link pipe coupling;

a recessed area defining a downward facing locking shoulder located on an exterior surface of the pin;

release means including a release member carried by the box and located in engagement with the locking shoulder when in a locked position to lock the pin and box together and for moving radially outward from the shoulder relative to the axis of weak link pipe coupling to a released position to release the weak link pipe coupling in response to a selected axial minimum force of substantial magnitude applied to the weak link pipe coupling as a result of excessive bending of the string of riser;

a back-up member which locates radially outward of and in back-up engagement with the release member when in the locked position to prevent said radial outward movement, the back-up member being axially movable relative to the release member to an armed position out of back-up engagement with the release member to allow the release member to move radially outward; and at least one hydraulic cylinder and piston mounted to the box and connected to the back-up member for selectively moving the back-up member to the armed position when supplied with hydraulic pressure from the floating vessel.

10. The improvement according to claim 9 wherein the selected axial minimum force is substantially 300,000 pounds.

11. The improvement according to claim 9 further comprising antirotation means including a key on one of the pipe sections which is biased into engagement with a slot on the other of the pipe sections for preventing rotation of the pin and box relative to each other once engaged.

12. The improvement according to claim 9 wherein the locking shoulder is a portion of a locking groove formed on the pin.

13. The improvement according to claim 9 wherein the release member is carried in a retaining groove located in the box.

14. The improvement according to claim 9 wherein the box has an internal smooth tapered surface that is tapered at an angle of substantially five to six degrees relative to the axis of the weak link coupling, and wherein the pin has a smooth exterior surface that is at the same angle as the tapered surface of the box and which slidingly engages the tapered surface of the box to convert bending forces into axial forces.

15. The improvement according to claim 9 wherein the release member is an inward biased split ring that requires the selected axial minimum force to move from the locking shoulder after the back-up member has moved to the armed position.

16. The improvement according to claim 9 wherein there are a plurality of the hydraulic cylinders and pistons spaced circumferentially around the box, and wherein the improvement further comprises:

a retaining ring mounted to pistons for movement therewith and encircling the box for requiring all of the pistons to move in unison.

17. In a riser string extending from a floating vessel to a subsea well, an improved weak link to cause the riser string to part at a selected point in the event of excessive tension due to bending, the weak link comprising in combination:

a weak link pipe coupling joining two pipe sections of the riser string together, the weak link pipe coupling having an axis and a pin on one of the pipe sections that slidingly locates within a box on the other of the pipe sections;

a locking groove located on an exterior surface of the pin having a downward facing shoulder;

an inward biased split annular release member carried by the box and located in engagement with the locking groove, the release member having an upward facing shoulder that engages the downward facing shoulder when in a locked position to lock the pin and box together, the release member being movable radially outward from the downward facing shoulder relative to the axis of weak link pipe coupling under a selected axial minimum force of substantial magnitude due to excessive bending of the riser string to a released position to release the weak link pipe coupling;

a back-up member which locates radially outward of and in back-up engagement with the release member when in the locked position to prevent said radial outward movement, the back-up member being axially movable relative to the release member to an armed position out of back-up engagement with the release member to allow the release member to move radially outward if said minimum force is reached; and a plurality of hydraulic cylinders and pistons mounted to and positioned circumferentially around the box and being connected to the back-up member, the hydraulic cylinders being supplied with hydraulic fluid pressure through a line exterior of the riser from the vessel for selectively moving the back-up member to the armed position.

18. The weak link according to claim 17 wherein the box has an internal smooth tapered surface that is tapered at an angle of substantially five to six degrees relative to the axis of the weak link coupling, and wherein the pin has a smooth exterior surface that is at the same angle as the tapered surface of the box, the tapered surfaces engaging each other so as to convert bending forces into axial tensile forces.

19. The weak link according to claim 17 wherein the minimum force required is substantially 300,000 pounds.

20. The weak link according to claim 18 wherein the weak link further comprises:

a retaining ring mounted to pistons for movement therewith and encircling the box for requiring all of the pistons to move in unison.

21. In a riser string extending from a floating vessel to a subsea well, an improved weak link to cause the riser string to part at a selected point in the event of excessive tension due to bending, the weak link comprising in combination:

a weak link pipe coupling joining two pipe sections of the riser string together, the weak link pipe coupling having an axis and a pin on one of the pipe sections that slidingly and nonrotatably locates within a box on the other of the pipe sections;

release means for locking the box and pin together and for releasing the box and pin from each other under an axial tensile minimum force of substantial magnitude resulting from excessive bending; and the box having an internal smooth tapered surface that is tapered at an angle of substantially five to six degrees relative to the axis of the weak link coupling, and wherein the pin has a smooth exterior surface that is at the same angle as the tapered surface of the box, the tapered surfaces of the box and pin engaging each other to convert bending forces exerted on the weak link pipe coupling into axial tensile forces.

22. A method for releasing two pipe sections in a string of riser extending from a subsea well to a floating vessel in the event of excessive bending applied to the riser, comprising:

mounting a weak link pipe coupling in the string which has a release means including a release member selected to part the weak link pipe coupling if a selected minimum force of substantial magnitude due to excessive bending is applied to the string;

mounting an arming means including an arming member to the weak link pipe coupling which has a locked position that will prevent operation of the release member even if the minimum force is reached, and has an armed position which allows the release member to release at the minimum force;

maintaining the arming member in the locked position during normal operations of the string; then, in the event excessive axial force due to bending is a possibility, moving the arming member to the armed position so that if the minimum force is reached, the release member will allow the weak link pipe coupling to part.

23. The method according to claim 22 wherein the weak link pipe coupling has a strength to withstand axial force that is at least equal to the strengths of the other pipe sections of the string while the arming member is in the locked position and wherein the minimum force is substantially 300,000 pounds.

* * * * *

UNITED STATES PATENT AND TRADEMARK OFFICE
CERTIFICATE OF CORRECTION

PATENT NO. : 5,382,056
DATED : 01/17/95
INVENTOR(S) : Lionel J. Milberger

It is certified that error appears in the above-indentified patent and that said Letters Patent is hereby corrected as shown below:

At Column 3, line 13, after "force" and before "required" insert --is--;

At column 3, line 23, after "component" and before "release" insert --on--;

At column 3, line 39, after "members" and before "are" insert --35--;

At column 4, line 30, after "vertical" and before "77" insert --slot--;

At column 4, line 34, "mace" should be --made--;

At column 4, line 37, after "pin" and before "as" insert --19--;

At column 4, line 38, after "be" and before "an" insert --in--; and

At column 5, line 16, "3" should be --31--.

Signed and Sealed this

Nineteenth Day of December, 1995

Attest:

BRUCE LEHMAN

*Attesting Officer*   *Commissioner of Patents and Trademarks*